United States Patent [19]

Leiner et al.

[11] 4,174,336

[45] Nov. 13, 1979

[54] AQUEOUS HEAT CURABLE PARTICULATE COATING COMPOSITION OF ELASTOMERIC EMULSION COPOLYMER AND THERMOSETTING COPOLYMER

[75] Inventors: Howard H. Leiner, Southfield, Mich.; Lee E. Koepke, Wayzata, Minn.; Dennis R. Gelarden, Livonia; John L. Gardon, Birmingham, both of Mich.

[73] Assignee: M & T Chemicals Inc., Stamford, Conn.

[21] Appl. No.: 915,734

[22] Filed: Jun. 15, 1978

Related U.S. Application Data

[63] Continuation-in-part of Ser. No. 755,647, Dec. 30, 1976, abandoned.

[51] Int. Cl.$^2$ ............................................. C08L 31/02
[52] U.S. Cl. .................. 260/29.7 UP; 260/29.7 UA; 260/29.7 W; 526/303; 526/317; 526/323.2
[58] Field of Search ............. 260/29.6 RW, 29.6 RB, 260/901, 29.7 UP, 29.7 UA, 29.7 W

[56] References Cited

U.S. PATENT DOCUMENTS

| | | | |
|---|---|---|---|
| 3,222,419 | 12/1965 | Jubilee et al. | 260/901 |
| 3,741,923 | 6/1973 | Fritsche et al. | 260/901 |
| 3,770,848 | 11/1973 | Labana et al. | 260/851 |
| 3,793,282 | 2/1974 | Fock et al. | 260/885 |
| 3,845,023 | 10/1974 | Dalibor | 260/851 |
| 3,845,066 | 10/1974 | Vasta | 260/901 |

*Primary Examiner*—Harold D. Anderson
*Attorney, Agent, or Firm*—Kenneth G. Wheeless; Robert Spector

[57] ABSTRACT

Protective and decorative coatings for metal are prepared using aqueous polymer compositions consisting essentially of a thermosetting vinyl or acrylic polymer which has been polymerized in the presence of a preformed, crosslinked, elastomeric copolymer. The rate at which the monomers of the thermosetting polymer are added to the reaction mixture is substantially equal to the rate of reaction of these monomers to form the thermosetting polymer. This is believed to result in the formation of minute emulsified particles containing a core of the elastomeric copolymer surrounded by a layer of the thermosetting polymer. The thermosetting polymer contains pendant hydroxyl groups and a latent, heat-activated crosslinking agent.

11 Claims, No Drawings

AQUEOUS HEAT CURABLE PARTICULATE COATING COMPOSITION OF ELASTOMERIC EMULSION COPOLYMER AND THERMOSETTING COPOLYMER

BACKGROUND OF THE INVENTION

This application is a continuation-in-part of application Ser. No. 755,647, filed Dec. 30, 1976, now abandoned.

This invention relates to aqueous coating compositions. This invention further relates to aqueous coating compositions containing dispersed particles of acrylic polymers having incorporated therein a latent heat activated curing agent which yields cross-linked, solvent-resistant coatings of sufficient flexibility to be employed as protective and decorative coatings for metal.

Thermosetting addition type polymers, including acrylic and vinyl polymers, are useful materials for coating metal substrates. The polymer chains contain reactive groups such as hydroxyl groups which are reacted with an external latent crosslinking agent, such as the N-methylol melamines, N-alkoxy melamines, N-methylol ureas or N-alkoxy ureas that is included in the coating formulation. When heated the latent crosslinking agent decomposes to the active species, which then reacts with hydroxyl or other functional groups on adjacent polymer chains to form a crosslinked coating exhibiting the desirable properties of hardness and solvent-resistance. The shortcoming of this type of coating is that the flexibility associated with good impact resistance usually requires that the coating be relatively soft. Additionally, the aforementioned external latent crosslinking agents often undergo a spontaneous and gradual decomposition at ambient temperature with a resultant increase in viscosity of the coating formulation. These types of formulations therefore cannot be stored for extended periods of time. U.S. Pat. No. 3,793,282 discloses heat-hardenable acrylic type graft copolymers wherein the latent crosslinking agent, an N-methoxymethyl amide of acrylic or methacrylic acid, is present in the polymer. At elevated temperature this compound decomposes to yield methylol groups which react with hydroxyl groups that are also present on the polymer chain to yield a cross-linked structure. The graft copolymers are prepared by polymerization of a hard, brittle copolymer in the presence of a solubilized or emulsified elastomeric copolymer obtained by solution or emulsion polymerization in water or an organic liquid. The patent discloses adding the monomers for the hard, brittle copolymer as a single portion to the preformed solution or dispersion of the elastomeric component. Under these conditions the product is believed to be a graft copolymer wherein sections of the brittle polymer are bonded to a "backbone" of elastomeric copolymer. Alternatively, the monomers of the brittle component may penetrate into particles of the elastomeric component prior to polymerization, resulting in an intermingling of brittle and elastomeric polymers in each particle of polymer. Regardless of which type of structure is actually formed, coatings prepared using the polymers disclosed in the aforementioned U.S. Pat. No. 3,793,282 do not exhibit the high impact strength desired for protective and decorative metal coatings.

One objective of this invention is to provide a coating composition wherein the film-forming component is a copolymer containing a latent, heat-activated crosslinking agent. The copolymers do not exhibit the undesirable characteristics of the aforementioned prior art materials. Coatings incorporating the present copolymers exhibit superior solvent and impact resistance.

SUMMARY OF THE INVENTION

This invention provides improved, heat-curable coating compositions consisting essentially of an aqueous medium containing dispersed polymer particles which, in turn, consist essentially of an elastomeric emulsion copolymer A and a thermosetting copolymer B, wherein (1) copolymer B is prepared in said aqueous medium and in the presence of preformed copolymer A, (2) the rate of addition of the constituent monomers of copolymer B is substantially equal to the reaction rate of said monomers to form copolymer B, (3) copolymer B constitutes from 10 to 70% of the combined weight of copolymers A and B, exhibits a weight average molecular weight of from 5,000 to 50,000 and a glass transition temperature from 40° to 75° C., (4) the repeating units of copolymer B are derived from
   (a) at least one monoethylenically unsaturated compound containing from 2 to 20 carbon atoms,
   (b) from 2 to 20%, based on the weight of copolymer B, of at least one monoester of a diol containing from 2 to 4 carbon atoms and acrylic or methacrylic acid, said monoester being copolymerizable with said monoethylenically unsaturated compound, and
   (c) from 5 to 40%, based on the weight of copolymer B, of at least one latent curing agent selected from the group consisting of N-alkoxymethyl acrylamides and N-alkoxymethyl methacrylamides wherein the alkoxy group contains from 1 to 8 carbon atoms, (5) copolymer A exhibits a glass transition temperature of from $-15°$ to $+25°$ C., (6) the repeating units of copolymer A are derived from
   (a) at least two monoethylenically unsaturated compounds containing from 2 to 20 carbon atoms, and
   (b) from about 0.5 to 5.0%, based on the weight of copolymer A, of a polyfunctional compound selected from the group consisting of diesters and triesters derived from acrylic or methacrylic acid and a diol containing from 2 to 8 carbon atoms or a triol containing from 3 to 8 carbon atoms, divinyl benzene and allyl methacrylate.

DETAILED DESCRIPTION OF THE INVENTION

A. The Elastomeric Copolymer

The elastomeric component of the present polymer compositions is a slightly crosslinked polymer of at least two monoethylenically unsaturated compounds and exhibits a glass transition temperature, hereinafter referred to as $T_g$, of from $-15°$ to $+25°$ C. It will be understood that the same monomers can be employed to form both components of the present polymer compositions. The proportions of "hard" and "soft" monomers are adjusted to obtain the desired $T_g$, as is known in the art. Suitable monoethylenically unsaturated compounds include olefins, such as ethylene, propylene, butylene, iso-butylene and cyclohexene; vinyl monomers such as vinyl chloride, vinyl acetate, styrene and α-methylstyrene, ethylenically unsaturated acids such as acrylic, methacrylic, maleic and itaconic acids and derivatives of these acids, including acrylonitrile, methacrylonitrile and acrylamide. Among the preferred ethylenically unsaturated compounds are esters of acrylic and methacrylic acids wherein the alcohol residue is monofunctional and contains from 1 to 8 carbon atoms. Polymers obtained from these esters have been shown to yield superior coatings. Preferred esters include methyl methacrylate, ethyl acrylate, butyl acrylate and 2-ethylhexyl acrylate. In addition to esters of acrylic and methacrylic acids with monofunctional alcohols containing from 1 to 8 carbon atoms, one or more of the aforementioned copolymerizable compounds containing one carbon to carbon double bond can be employed as comonomers. The monomers of the elastomeric component (copolymer A) are polymerized as an aqueous emulsion using conventional catalysts, emulsifiers and reaction conditions to obtain a weight average molecular weight of at least 20,000. The elastomeric component also includes from 0.1 to 15.0%, preferably from 0.5 to 5%, based on the weight of the elastomeric component, of at least one bi- or polyfunctional monomer which is capable of uniformly crosslinking the copolymer. Preferred crosslinking agents are the alkylene glycol diacrylates, including ethylene glycol diacrylate, butylene glycol diacrylate, propylene glycol diacrylate and the corresponding esters of methacrylic acid. Other conventional polyfunctional, copolymerizable monomers such as divinyl benzene and allyl methacrylate can be employed in place of the aforementioned diacrylates.

Any of the known emulsifiers for the polymerization of acrylates and methacrylates can be used to prepare the present compositions. A low level of emulsifier is desirable, preferably below three percent by weight based on the total weight of polymerizable monomers charged in all stages. Useful emulsifying agents include common soaps, alkylbenzenesulfonates, such as sodium dodecyl benzene sulfonate, alkylphenoxypolyethylene sulfonates, sodium lauryl sulfate, salts of long-chain amines and salts of long-chain carboxylic and sulfonic acids. In general, the emulsifier should be a compound containing hydrocarbon groups of 8-22 carbon atoms coupled to highly polar solubilizing groups such as alkali metal and ammonium carboxylate groups, sulfate half ester groups, sulfonate groups and phosphate partial ester groups.

The polymerization medium used in each of the two stages or steps contains an effective amount of a suitable water-soluble, free radical generating polymerization initiator, which is activated either thermally or by an oxidation-reduction (redox) reaction. The preferred initiators are those which generate free radicals by a redox reaction, since they allow for efficient polymerization at moderate temperatures. Examples of suitable initiators are combinations of ammonium or alkali metal persulfate and sodium formaldehyde sulfoxolate. An organic peroxide such as cumene hydroperoxide can be added to ensure the complete conversion required during preparation of the elastomeric component of the present polymer composition.

B. The "Glassy" or Thermosetting Copolymer

The monoethylenically unsaturated compounds employed to prepare the first or thermosetting component of the present compositions are similar to those used in the elastomeric copolymer. As is true for the elastomeric copolymer, esters of acrylic or methacrylic acid wherein the alcohol residue contains from 1 to 8 carbon atoms are the preferred monomers for the thermosetting phase. The glassy component contains a higher percentage of monomers yielding "glassy" homopolymers, such as methyl methacrylate, than the elastomeric phase to achieve the desired $T_g$ of from 40° to 75° C.

In addition to the aforementioned monofunctional monomers, the thermosetting copolymer also contains from 5 to 40% by weight of repeating units derived from at least one N-alkoxymethyl acrylamide or N-alkoxy methacrylamide and from 2 to 20% by weight of at least one hydroxyalkyl acrylate or methacrylate. At elevated temperatures the alkoxymethyl acrylamide or methacrylamide decomposes to yield a methylol group that reacts relatively rapidly with hydroxyl groups on adjacent polymer molecules to yield a cross-linked film exhibiting the desired resistance to organic solvents. Since decomposition of N-alkoxyacrylamides occurs in acidic media, it is preferable that a small amount of carboxylic acid groups be present in the thermosetting polymer. This is readily achieved by including from 0.1 to 5.0%, based on the total weight of monomers for the thermosetting polymer, of a copolymerizable ethylenically unsaturated acid. Acrylic, methacrylic, maleic and itaconic acids are preferred for this purpose.

To achieve optimum film-forming properties it is desirable that the weight average molecular weight of the thermosetting copolymer be from 2,000 to 200,000. This can be accomplished by including an efficacious amount, usually from 0.05 to 5.0%, based on total monomer weight of a conventional chain transfer agent in the monomer mixture. Mercaptans, mercaptocarboxylic acids, mercaptocarboxylic esters and halogen-containing hydrocarbons are suitable chain transfer agents.

The present polymer compositions are prepared using a two step procedure. In the first stage, a small portion of the monomer mixture for the elastomeric copolymer is combined with water, surfactant and initiator under an inert atmosphere. Preferably an inorganic buffer such as ammonium bicarbonate is also present to maintain the pH of the reaction mixture from 3.5 to 7.5. The resultant mixture is heated to a temperature of 40°-60° C., at which time the remaining portion of first stage monomers together with additional initiator are gradually added to the reaction mixture. Heating is continued until substantially all of the first stage monomer has been polymerized. The degree of monomer conversion is readily determined by measuring the concentration of non-volatile material present in the reaction mixture.

Following completion of the first stage one or more surfactants are added. The mixture of monomers for the thermosetting "glassy" copolymer and an efficacious amount of polymerization initiator are then gradually added and rapidly polymerized. The addition rate is substantially equal to the rate of polymerization, and the concentration of unreacted monomer in the reaction mixture is virtually zero. This is believed to result in an attachment and layering of the thermosetting polymer onto the preformed particles of the elastomeric polymer in contrast to the intimate mixture which results when there is significant penetration of the "glassy" phase monomers into the particles of elastomeric polymer prior to polymerization. The coatings obtained using this latter type of polymer exhibit considerably lower impact strength than those prepared using polymers prepared in accordance with the present method as set forth in the accompanying examples. The addition of the monomers generally requires from four to sixteen hours, depending upon the size of the charge.

Polymer compositions prepared in accordance with the present method are blended with suitable coalescing solvents to obtain the film-forming component of protective and decorative coatings for use on metal surfaces. The coalescing solvents are present at a concentration of from 1.0 to about 20%, based on polymer weight. Suitable coalescing solvents include monoethers of diols and dimers thereof, such as diethylene glycol, in addition to the acetic acid esters of these monoethers. Specific preferred coalescing solvents are ethylene glycol monobutyl ether, diethylene glycol monobutyl ether and ethylene glycol monomethyl ether. Other solvents for the polymer that will lower the minimum film-forming temperature thereof can also be employed as coalescing solvents. Suitable coalescing solvents for the various copolymers that can be employed as the "glassy" and thermosetting phases are well known in the art and, as such are not part of the present invention. The minimum film-forming temperature of the final polymer in the presence of the coalescing solvent should be from 0° to 80° C., preferably from 0° to 25° C.

Upon heating at temperatures from 90° to 180° C., the coatings formed using the present compositions spontaneously crosslink to yield durable, solvent-resistant coatings exhibiting exceptionally high levels of impact strength. This desirable combination of properties cannot be achieved using the polymerization techniques disclosed in the prior art relating to coatings.

The following example discloses a representative polymer composition encompassed by the accompanying claims.

EXAMPLE

A reactor equipped with a mechanically driven stirrer, thermometer, addition funnel, reflux condenser and nitrogen inlet was charged with 6900 cc. of deionized water, 161 g of a surfactant composition consisting essentially of a mixture of an ethoxylated nonyl phenol and lauryl alcohol ethoxylate sulfate, available from Stepan Chemical Company as Polystep ® J-3, 75 g of the sodium salt of a branched alkylbenzene sulfonate available as Polystep ® A-16 from Stepan Chemical Company, 9 g of ammonium bicarbonate, 1.4 g of a 5% by weight aqueous solution of a ferrous-ethylene diamine tetraacetic acid complex and a 984 cc portion of a monomer mixture containing 2305 cc of methyl methacrylate, 2461 cc of butyl acrylate, 54 cc of N-isobutoxymethyl acrylamide, 22 cc of hydroxypropyl methacrylate, 22 cc of acrylic acid and 45 cc of 1,4-butanediol dimethacrylate. The resultant liquid mixture was heated to 40° C. while nitrogen was bubbled through it for 0.5 hour. Polymerization was then initiated by adding a solution containing 7.7 g ammonium persulfate and 50 cc of deionized water, followed by a solution containing 1.4 g of sodium formaldehyde sulfoxylate and 25 cc deionized water. The temperature of the reaction mixture increased spontaneously to 55° C., at which time the remainder of the aforementioned monomer mixture together with a solution containing 8.1 g ammonium persulfate, 24 g of the aforementioned surfactant composition and 100 cc of deionized water were gradually added over a period of 1 to 1.5 hours. The temperature of the reaction mixture was maintained between 52° and 55° C. during the addition by controlling the temperature of the heating bath. The reaction mixture was maintained at from 50° to 52° C. for 1.5 hours following completion of the monomer addition to ensure substantially complete conversion to polymer. A solution containing 250 cc of deionized water, 75 g of Polystep ® A-16 and 402 g of Polystep ® J-3 was then added to the reaction mixture and stirring was continued for an additional 0.5 hour, at which time the following mixtures were added gradually and concurrently over a period of from 4 to 5 hours while the temperature was maintained at from 52° to 55° C.

|             |                                | |
|-------------|--------------------------------|---------|
| Mixture I   | methyl methacrylate            | 2566 cc |
|             | butyl acrylate                 | 878 cc  |
|             | N-isobutoxymethyl acrylamide   | 1026 cc |
|             | hydroxypropyl methacrylate     | 415 cc  |
|             | acrylic acid                   | 22 cc   |
|             | butyl mercaptopropionate       | 20 cc   |
|             | t-butyl hydroperoxide          | 5 cc    |
| Mixture II  | ammonium persulfate            | 15.8 g  |
|             | deionized water                | 500 cc  |
| Mixture III | sodium formaldehyde sulfoxylate| 13.5 g  |
|             | ammonium bicarbonate           | 13.5 g  |
|             | deionized water                | 500 cc  |

Following completion of this addition the reaction mixture was heated for from 1 to 1.5 hours at a temperature of 50°–55° C. The reaction mixture was then cooled to 30° C. and passed through a 200 mesh filter. The pH of the mixture was then adjusted to from 9.0 to 9.4 using dimethylaminoethanol.

The resultant polymer emulsion was blended with 7% (based on polymer weight) of the monobutyl ether of diethylene glycol and then coated as a 0.006 inch (0.015 cm)-thick film onto a steel panel. The coating was dried at ambient temperature for 10 minutes and at 93° C. for 10 minutes. Curing of the coating was achieved by heating it at 176° C. for 15 minutes. The thickness of the cured film was 0.0015 inch (0.0039 cm). The film was equivalent in hardness to an H or 2H pencil (the hardest pencil which did not penetrate the surface of the coating). The coating was not visibly damaged when subjected to an impact of 120 inch-pounds (92–138 cm-kg) on the coated side of the panel or 80–120 inch-pounds (92–138 cm-kg) on the reverse side.

For purposes of comparison a second polymer composition was prepared using the foregoing procedure, with the exception that the monomer mixture for the thermosetting polymer was added over a 2 to 2.5 hour period rather than the 4 to 5 hours employed in the foregoing procedure. Increasing the rate of monomer addition had a profound and adverse effect on the impact resistance of the cured coating. The coating was visibly damaged following an impact of 30 inch-pounds (34.5 cm-kg) on the coated side and 10 inch-pounds (11.5 cm-kg) on the uncoated side. This demonstrates that the rate of monomer addition for the thermosetting phase strongly influences the properties of the final polymer. One explanation for the reduction in impact strength is that the monomers of the thermosetting phase penetrate the dispersed particles of elastomeric polymer prior to being polymerized, resulting in an intermingling of the two polymers rather than an encapsulation of the elastomeric copolymer by the thermosetting phase. The physical properties of polymers prepared in accordance with the present method are indicative of an encapsulated type of structure.

What is claimed is:

1. A heat-curable coating composition consisting essentially of an aqueous medium containing dispersed polymer particles which, in turn, consist essentially of an elastomeric emulsion copolymer A and a thermosetting copolymer B, wherein
   (1) copolymer B is prepared in the presence of preformed copolymer A,
   (2) the rate of addition of the constituent monomers of copolymer B is substantially equal to the reaction rate of said monomers to form copolymer B,
   (3) copolymer B constitutes from 10 to 70% of the combined weight of copolymers A and B, exhibits a glass transition temperature from 40° to 75° C.,
   (4) the repeating units of copolymer B are derived from
      (a) at least one monoethylenically unsaturated compound containing from 2 to 20 carbon atoms,
      (b) from 2 to 20%, based on the weight of copolymer B, of at least one monoester of a diol containing from 2 to 4 carbon atoms and acrylic or methacrylic acid, said monoester being copolymerizable with said monoethylenically unsaturated compound, and
      (c) from 5 to 40%, based on the weight of copolymer B, of at least one latent curing agent selected from the group consisting of N-alkoxymethyl acrylamides and N-alkoxymethyl methacrylamides wherein the alkoxy group contains from 1 to 8 carbon atoms,
   (5) copolymer A exhibits a glass transition temperature of from $-15°$ to $+25°$ C.,
   (6) the repeating units of copolymer A are derived from
      (a) at least two monoethylenically unsaturated compounds containing from 2 to 20 carbon atoms, and
      (b) from about 0.5 to 5.0%, based on the weight of copolymer A, of a polyfunctional compound selected from the group consisting of diesters and triesters derived from acrylic or methacrylic acid and a diol containing from 2 to 8 carbon atoms or a triol containing from 3 to 8 carbon atoms, divinyl benzene and allyl methacrylate.

2. A heat-curable coating composition as set forth in claim 1 wherein copolymers A and B are both derived from monoethylenically unsaturated compounds selected from the group consisting of esters of acrylic or methacrylic acid and monofunctional alcohols containing from 1 to 8 carbon atoms.

3. A heat-curable coating composition as set forth in claim 1 wherein said monoester of a diol is selected from the group consisting of hydroxypropyl methacrylate, hydroxypropyl acrylate, hydroxyethyl methacrylate and hydroxyethyl acrylate.

4. A heat-curable coating composition as set forth in claim 1 wherein said polyfunctional compound is a diester derived from
   (1) acrylic or methyacrylic acid and
   (2) a diol containing from 2 to 8 carbon atoms or a triol containing from 3 to 8 carbon atoms.

5. A heat-curable coating composition as set forth in claim 4 wherein said polyfunctional compound is an ester of ethylene glycol, 1,2-propanediol, butylene glycol or trimethylol propane.

6. A heat-curable coating composition as set forth in claim 1 wherein the minimum film-forming temperature of the composition is from 0° to 80° C.

7. A heat-curable coating composition as set forth in claim 1 wherein the copolymers A and B are both derived from polyfunctional compounds selected from the group consisting of methyl methacrylate, butyl acrylate, 2-ethylhexyl acrylate, ethyl methacrylate and butyl methacrylate.

8. A heat-curable coating composition as set forth in claim 1 wherein copolymer B contains from 0.5 to 5%, based on the weight of said polymer, of repeating units derived from acrylic, methacrylic, maleic or itaconic acids.

9. A heat-curable coating composition as set forth in claim 1 wherein copolymer B is prepared using a mercaptan, mercaptocarboxylic acid, mercaptocarboxylic ester or a halogenated hydrocarbon as a chain transfer agent.

10. A heat-curable coating composition as set forth in claim 1 wherein the latent curing agent for copolymer B is N-butoxymethylacrylamide or N-isobutoxymethacrylamide.

11. A heat-curable coating composition as set forth in claim 1 wherein, with the exception of any monoethylenically unsaturated carboxylic acid, the same monomer residues are present in copolymers A and B.

* * * * *